US005404968A

United States Patent [19]

Fletcher

[11] Patent Number: 5,404,968

[45] Date of Patent: Apr. 11, 1995

[54] AUTOMOTIVE SCREW LIFT SYSTEM WITH INTERCHANGEABLE COMPONENTS

[75] Inventor: Robert H. Fletcher, San Diego, Calif.

[73] Assignee: Advantage Lift Systems, Inc., San Diego, Calif.

[21] Appl. No.: 194,058

[22] Filed: Feb. 9, 1994

[51] Int. Cl.[6] .......... B60S 13/00

[52] U.S. Cl. .......... 187/205; 187/218; 254/92

[58] Field of Search .......... 187/8.62, 8.75, 8.41, 187/8.43, 24, 25, 8.69; 254/92, 89 R, 98, 7 R, 7 B

[56] References Cited

U.S. PATENT DOCUMENTS 2,015,357 9/1935 Weaver .......... 187/8.62

3,347,342 10/1967 Hott .......... 187/8.62

4,830,147 5/1989 Kawada .......... 187/8.62

*Primary Examiner*—Kenneth W. Noland

*Attorney, Agent, or Firm*—M. K. Silverman

[57] ABSTRACT

An automotive screw lift system includes a front below ground level cavity having a first depth below a surface level. A track element is secured across a mouth of the front cavity proximally to the front surface level. A trolley is provided which is proportioned for slidable longitudinal movement within the track of the front cavity. Further provided is a rear below ground level cavity having a depth greater than the first depth of the front cavity, the rear cavity disposed along a given longitudinal axis relative to the front cavity. Yet further provided is a cavity enclosure secured upon a top opening of the rear cavity, the enclosure positioned beneath the surface level. Within the front and rear below ground cavities are provided front and rear screw lift assemblies each having a length less than the first depth of the first cavity, each of the lift assemblies having upper ends having flanges selectably interfaceable with either of the trolley or the rear enclosure. Either of the screw lift assemblies may be positioned with either of the trolley or rear of the respective front and rear below ground cavities. Attached to upper ends of each lift assembly are vehicle wheel interface assemblies.

3 Claims, 9 Drawing Sheets

X
Z
30
54
46
70
28
66
68
42
48
50
REAR JACK
14
10
26
24
40
20
FRONT JACK
12

FRONT CYLINDER

REAR CYLINDER

AUTOMOTIVE SCREW LIFT SYSTEM WITH INTERCHANGEABLE COMPONENTS

BACKGROUND OF THE INVENTION

The present invention relates to the area of in-ground non-hydraulic automotive lift systems.

At about the time of the advent of in-ground hydraulic automotive lift systems, the introduction of which occurred in about the year 1920, certain limited efforts were made to create non-hydraulic automotive lift employing a thrust screw in combination with a load not mounted thereon. Examples known to the inventor of these efforts are reflected in U.S. Pat. No. 1,585,596 (1926) to Menges and U.S. Pat. No. 1,650,438 (1927) to Gass. Notwithstanding such early experimentation at about the time of the initial development of the in-ground hydraulic lift, most later efforts in connection with automotive screw lifts related to above ground systems of the type reflected in U.S. Pat. No. 3,602,338 (1971) to Sherry. However, for the most part, the use of screw lift systems in the automotive area have been limited to jack-type devices for use above ground and with relatively light vehicles, as is reflected in U.S. Pat. No. 3,532,322 (1970) to Webster.

It is noted that, in non-automotive areas, such as the elevator lift art, various screw drive mechanism have been proposed, as, for example, is shown in U.S. Pat. No. 3,468,401 (1969) to Letz.

The impetus, at this time, to the development of an in-ground automotive non-hydraulic automotive lift has come about through the realization:that in-ground hydraulic lifts, utilizing as they do hundreds of gallons of hydraulic fluid per year, give rise to an environmental hazard of proportions which are only now becoming apparent. More particularly, hydraulic fluid, while for the most part comprising an oil-based hydrocarbon carbohydrate, includes certain caustic and heavy metal additives including iron, lead, copper, tin, aluminum, nickel, phosphorus, molybdenum and cadmium. These additives, if permitted to penetrate the water table, can give rise to contamination of the water supply at concentrations of only a few parts per billion. There is, thereby, a burgeoning awareness on the part of environmental officials and others that the in-ground hydraulic lift, which has been a standard in service stations throughout the world since 1920, presents an actual and/or potential health hazard of still unmeasured magnitude.

The above problem, as may be appreciated, is more acute in areas where the water table is very high, such as in coastal areas of Florida and Louisiana where the water table can be as high as three feet below the surface. Thereby, the typical prior art in-ground hydraulic lift, which is installed to a depth of about nine feet in the ground, presents a particularly serious hazard in such areas. Further, the state-of-the-art of monitoring, typically being such means as microwave and electronic systems, the extent, location, and form of ground pollution has made it more feasible to conduct environmental surveys of virtually any business or industrial site for purposes of location of pollution, whether occurring as a result of system leakage or otherwise.

The instant invention may, thereby, be viewed as a response to the recognition of the environmental hazards associated with in-ground hydraulic technology.

Another difficulty in the prior art of hydraulic in-ground lifts is that the hydraulic cylinder of a rear piston assembly thereof is typically encased in at least three inches of concrete to comply with prevailing regulatory requirements. Notwithstanding such concrete encasement, the entire rear hydraulic assembly casing is, over time, susceptible to corrosion and therefore leakage. The economic consequences thereof are major disaster to a typical service station in that, to remedy such a problem, it is necessary to saw cut and jackhammer the floor of the service station to reach the bottom of the casing. This is a costly procedure which, as a further negative, renders the service station essentially unusable for a the period of at least days. In terms of cost, such a repair operation can entail expenses on the order of tens of thousands of dollars.

It is therefore in response to such potentially ruinous economic, and as yet still unmeasured environmental, consequences of seventy-five years of in-ground hydraulic lift usage that the instant invention is directed.

SUMMARY OF THE INVENTION

The inventive automotive screw lift system includes a front below ground level cavity having a first depth below a surface level thereof. Track means are secured across a mouth of said front cavity proximally to said front surface level. Trolley means are provided which are proportioned for slidable longitudinal movement within said track means of said front cavity. Further provided is a rear below ground level cavity having a depth greater than said first depth of said front cavity, said rear cavity disposed along a given longitudinal axis relative to said front cavity. Yet further provided are journal and cavity enclosures means secured upon a top opening of said rear cavity, said journal and enclosure means positioned beneath said surface level. Within said front and rear below ground cavities are provided respective front and rear screw lift assemblies each having a length less than said first depth of said first cavity, each of said lift assemblies having an upper ends thereof having flange means selectably interfaceable with either of said trolley means or said journal and cavity enclosure means. Thereby, either of said screw lift assemblies may be positioned with either of said respective trolley and journal means within either of said respective front and rear below ground cavities. Attached to upper ends of each lift assembly is vehicle wheel support or axle interface means.

It is, accordingly, an object of the invention to provide an in-ground automotive screw lift system having interchangeable front and rear screw lift assemblies.

It is another object to provide an automotive lift system which is completely non-hydraulic.

It is a further object of the invention to provide an automotive in-ground screw lift system which is environmentally non-invasive.

It is a yet further object to provide an automotive screw lift that can be easily and economically serviced.

The above and yet other objects and advantages of the present invention will become apparent from the hereinafter set forth Brief Description of the Drawings, Detailed Description of the Invention, and Claims appended herewith.

BRIEF DESCRIPTION OF THE DRAWINGS

FIGS. 7A and 78 are enlarged views of thrust bearing and thrust bearing drive assembly.

DETAILED DESCRIPTION OF THE INVENTION

Figure 1:
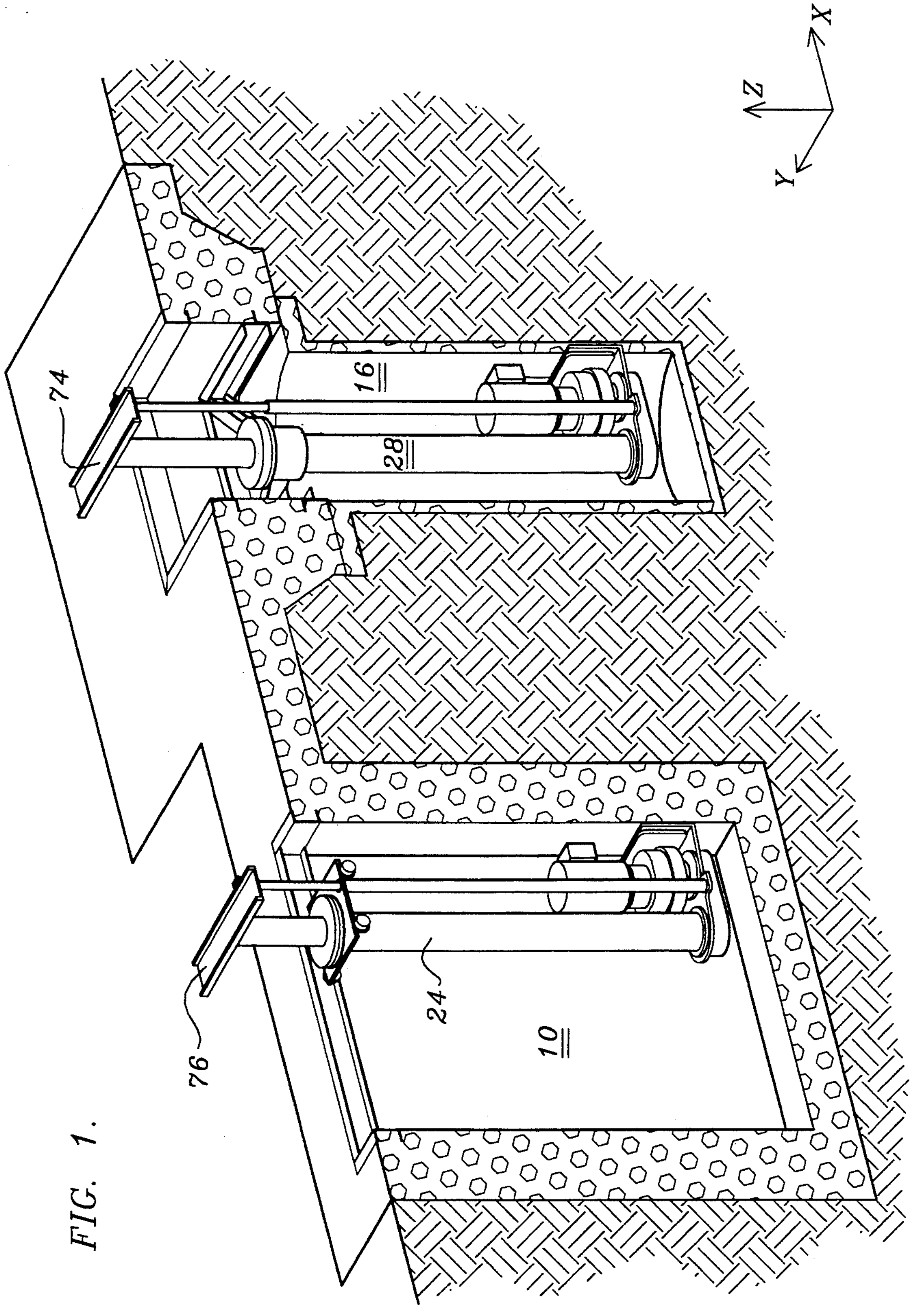
FIG. 1 is an isometric conceptual view of the inventive in-ground screw drive automotive lift system showing the pistons thereof in extended position.
Figure 2:
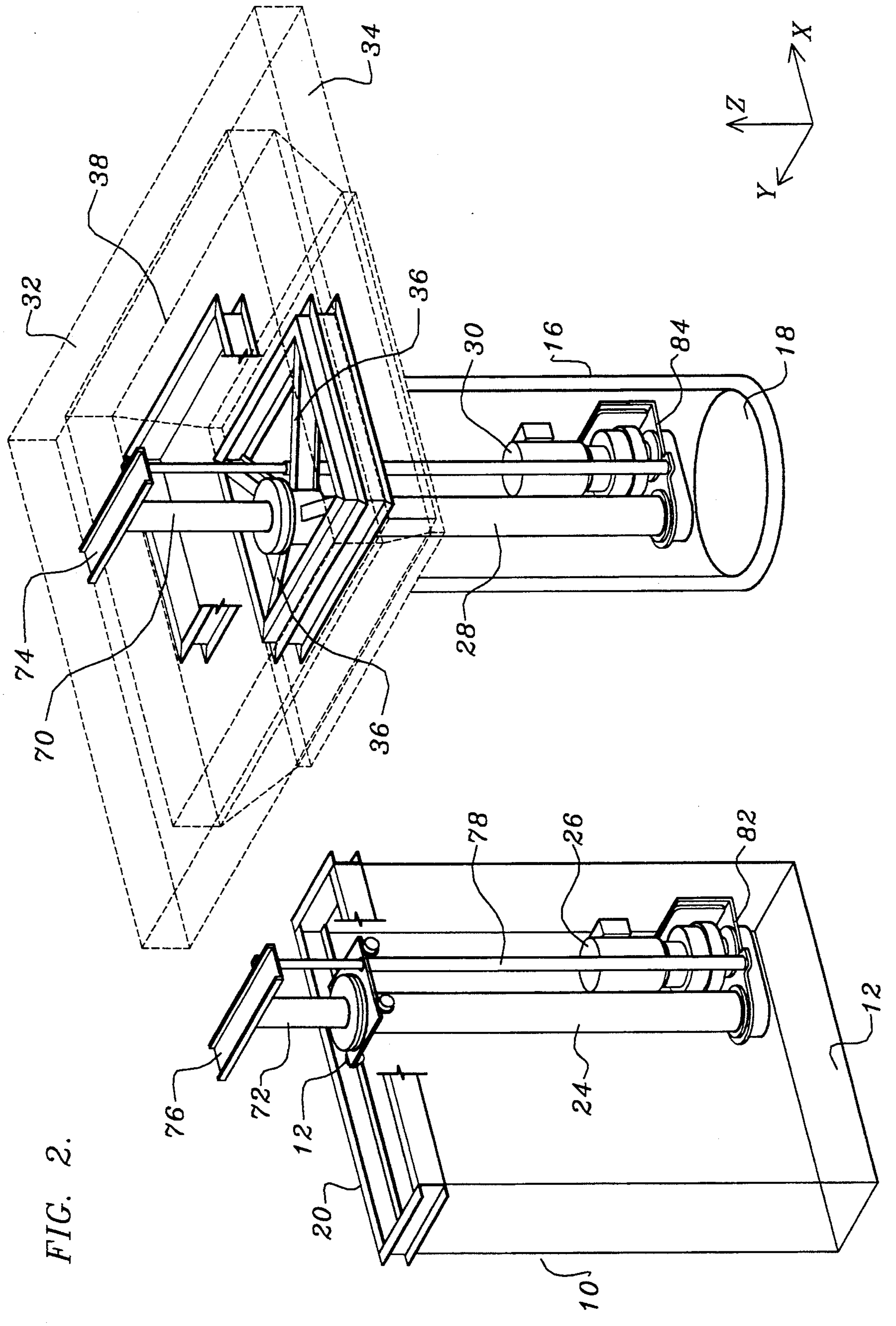
FIG. 2 is a isometric schematic view, generally similar to the view of FIG. 1, of the present system however showing the pistons thereof in partially retracted position.
Figure 3:
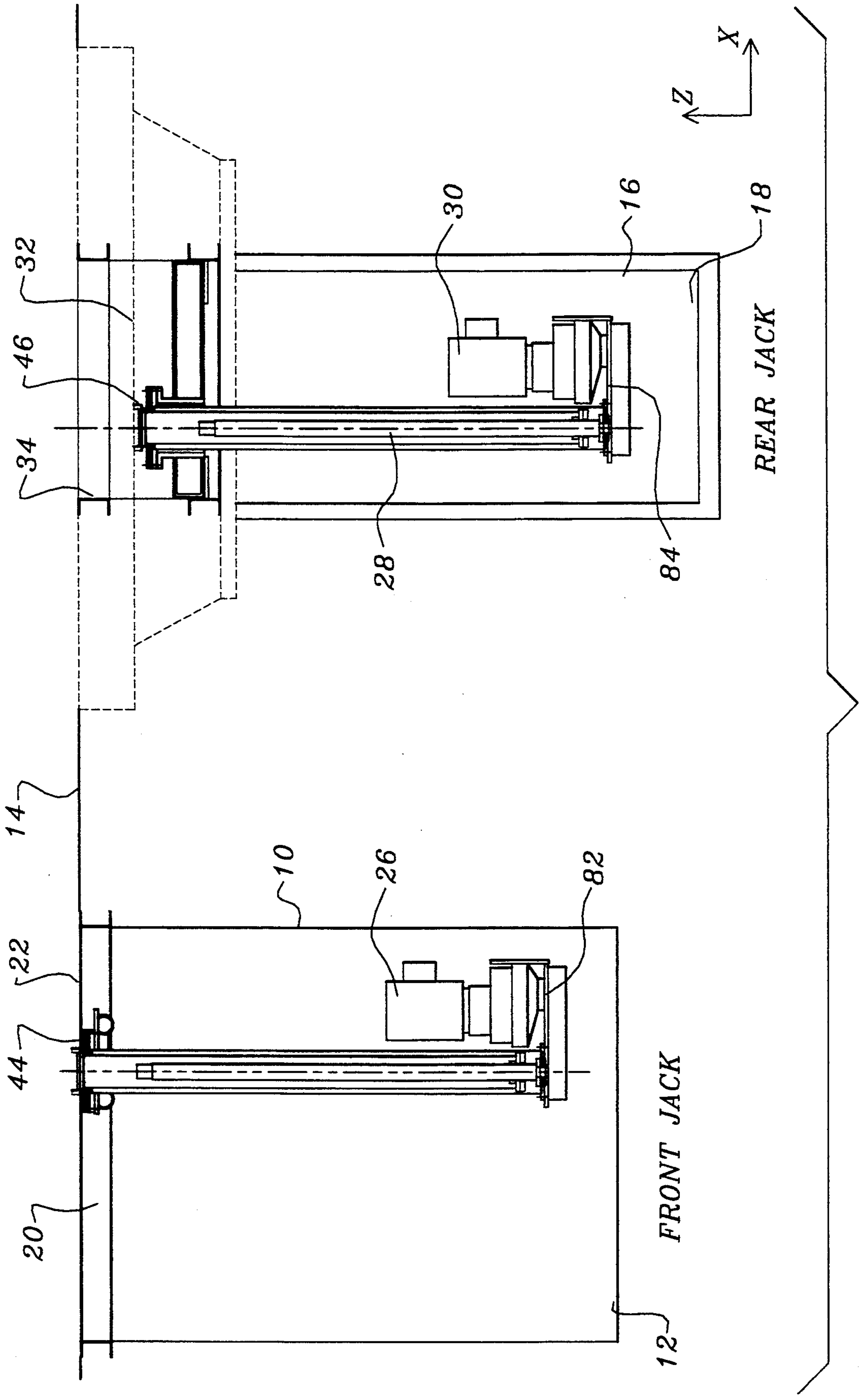
FIG. 3 is a longitudinal plan view of the system showing the pistons in retracted position.
Figure 4:
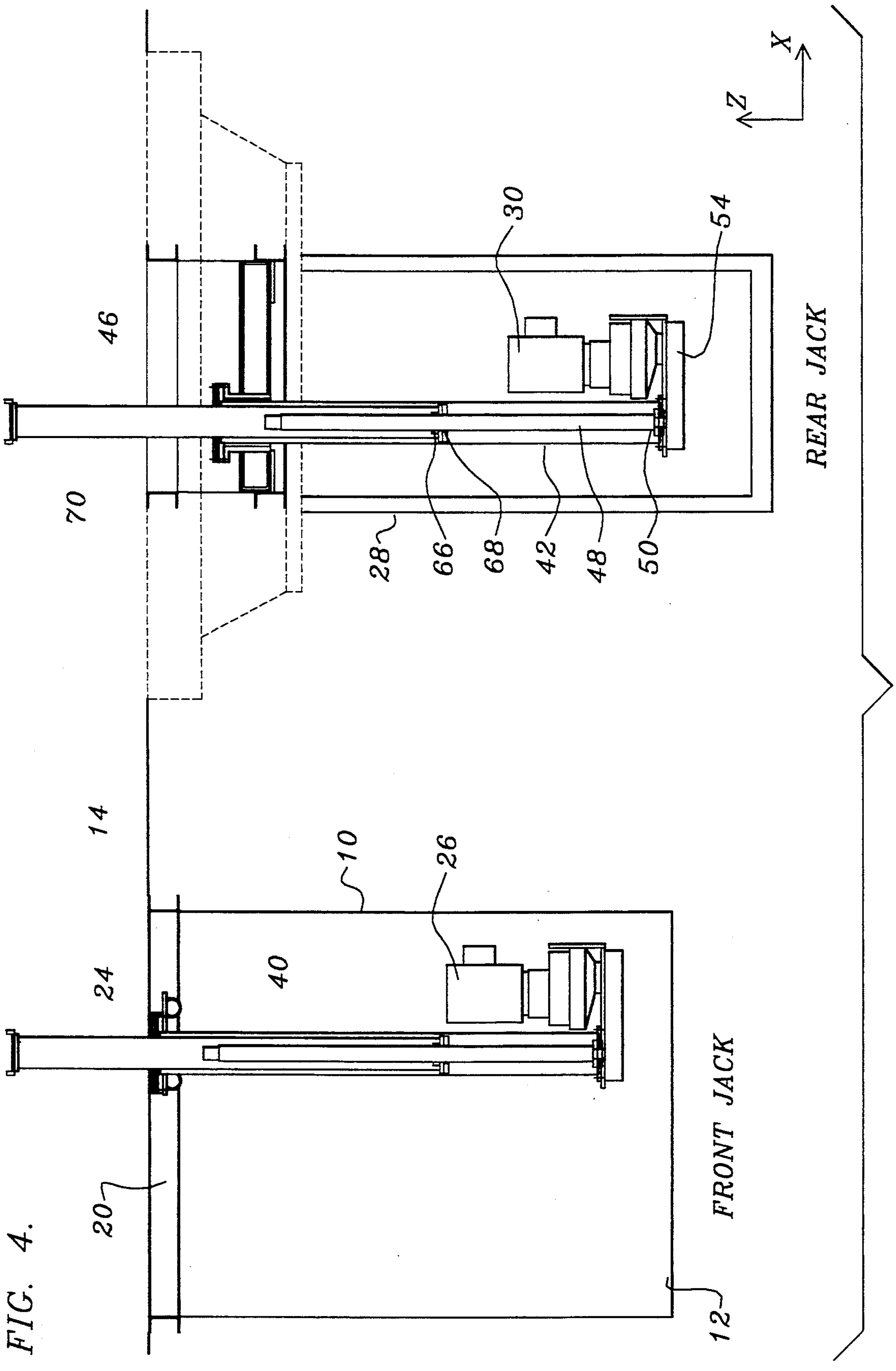
FIG. 4 is a plan view, similar to the view of FIG. 3, however showing the pistons in extended position.
Figure 5:
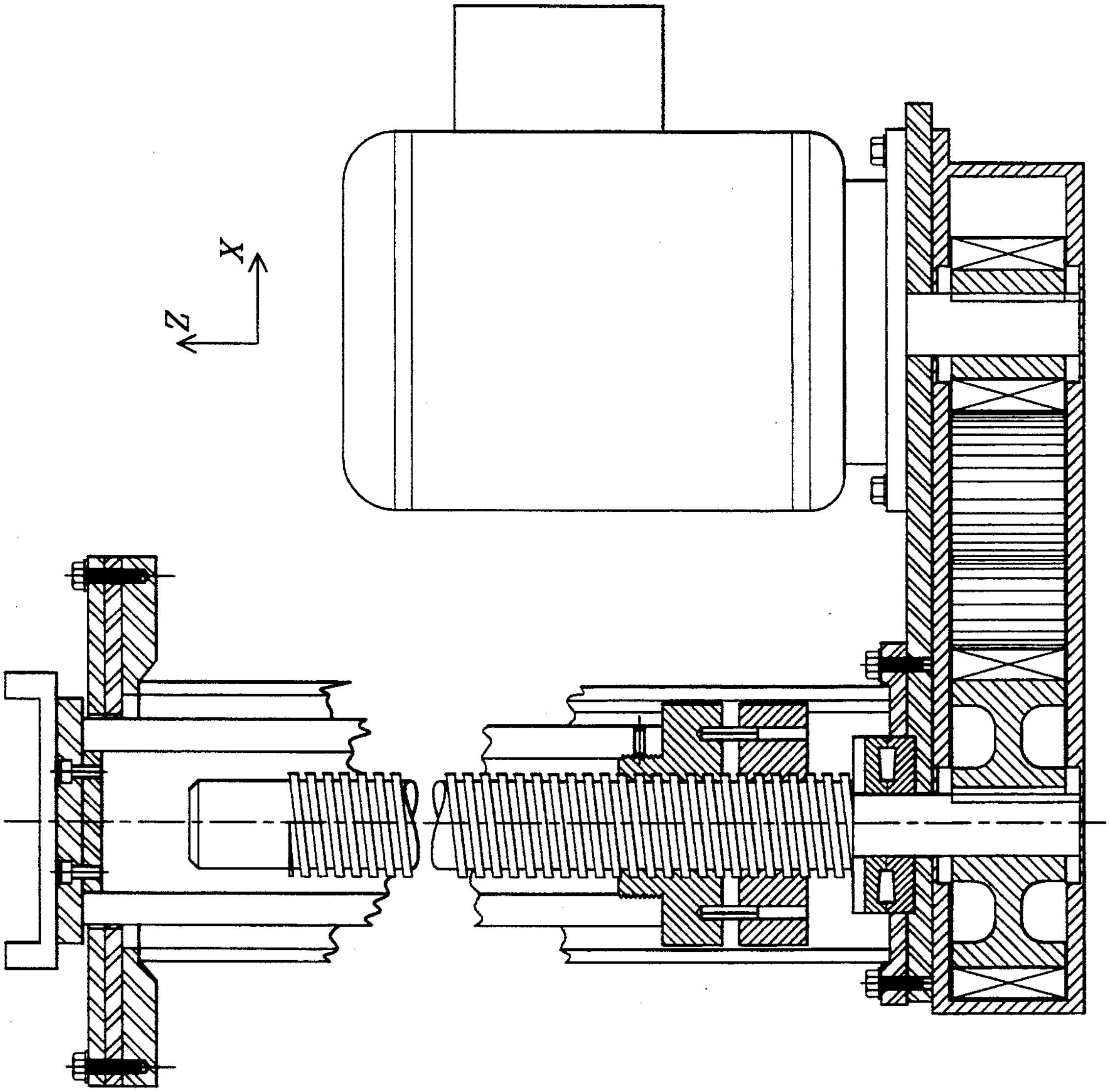
FIG. 5 is an enlarged view of the rear piston assembly.

With reference to FIG. 1 there is shown in conceptual view, instant inventive in-ground automotive lift system with interchangeable components. A detailed isometric view thereof is shown in FIG. 2, and front-to-rear views of the system through the plane (the xz plane) of front and rear screw assemblies 24 and 28 respectively appear in FIGS. 3 and 4.

In said views, the present system may be seen to include a front below ground level cavity 10 at a first depth 12 below a surface level 14 thereof. As may be further noted in FIGS. 1 thru 4, the inventive system also includes a rear below ground level cavity 16 having a depth 18 which is greater than said first depth 12 of said front cavity 10. As may be further noted, said cavities are disposed upon the same longitudinal axis, that is, the x-direction axis.

Said front cavity 12, in addition to its difference in depth relative to rear cavity 16, differs the rear cavity in terms of its upper method of treatment of the mouth of the cavity. More particularly, with respect to the mouth of front cavity 10 there is provided track means 20 which are secured across the mouth of front cavity 10. As may be noted in the views of FIGS. 3 and 4, track means 20 are located substantially at the level of ground 14.

Provided for slidable longitudinal movement within track means 20 is trolley means 22. There is thereby provided a capability of selectably sliding trolley means 22 and associated front screw lift assembly along the x-axis of the system. When this occurs the entire power means 26 (later described below) is moved therewith.

With reference to rear cavity 16 it is noted that there is provided said rear screw lift assembly 28 associated power means 30 which, in accordance with the present invention, is generally similar to said front screw lift assembly 24 and its said power means 26, typically differing from the rear assembly only in weight-bearing specification. Accordingly, as is more fully set forth below, the instant invention offers a feature, unique in the art, of inter-changeability, for service and other purposes, of the respective front and rear screw lift assemblies.

Said rear cavity 16 extends downwardly to said greater depth 18 than said front cavity depth 12. This is necessitated by the recess of rear cavity enclosure means 32, This recessed position of the rear cavity enclosure means 32 is necessitated by the fact that essentially all vehicles include a large transmission in the center of their rear axles. Accordingly, a sufficient recess 34 below ground level 14 must be provided so that the vehicle to be lifted can be suitably positioned before use of the system.

Figure 6:
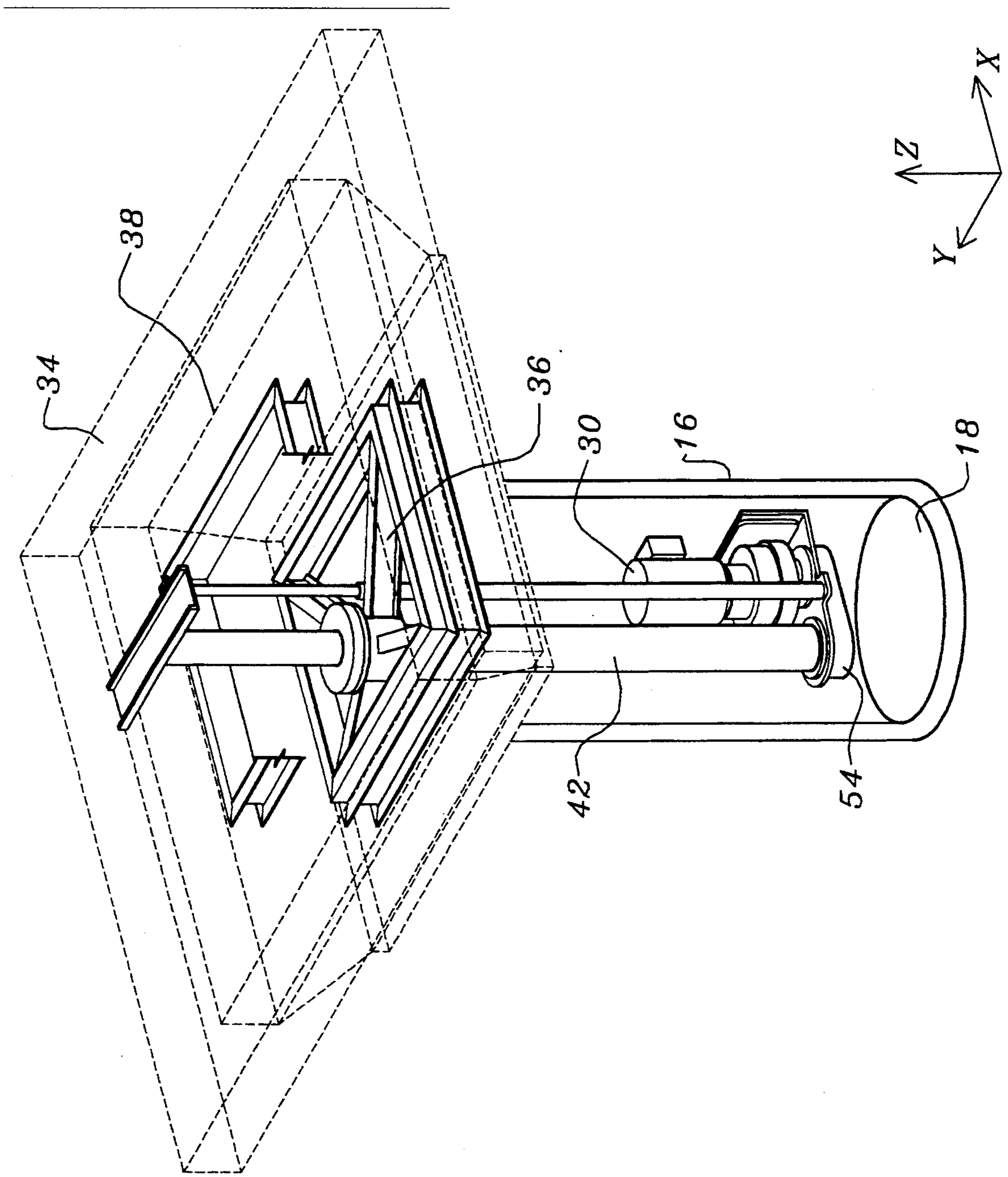
FIG. 6 is an isometric view of the rear jack assembly.

As may be noted in the view of FIGS. 2 and 6, said rear cavity enclosure means 32 consists essentially of a spider-like structure 36 and support means 38 which is positioned about the spider structure 36 within which is positioned the top of rear jack cylinder 42.

Figure 9A:
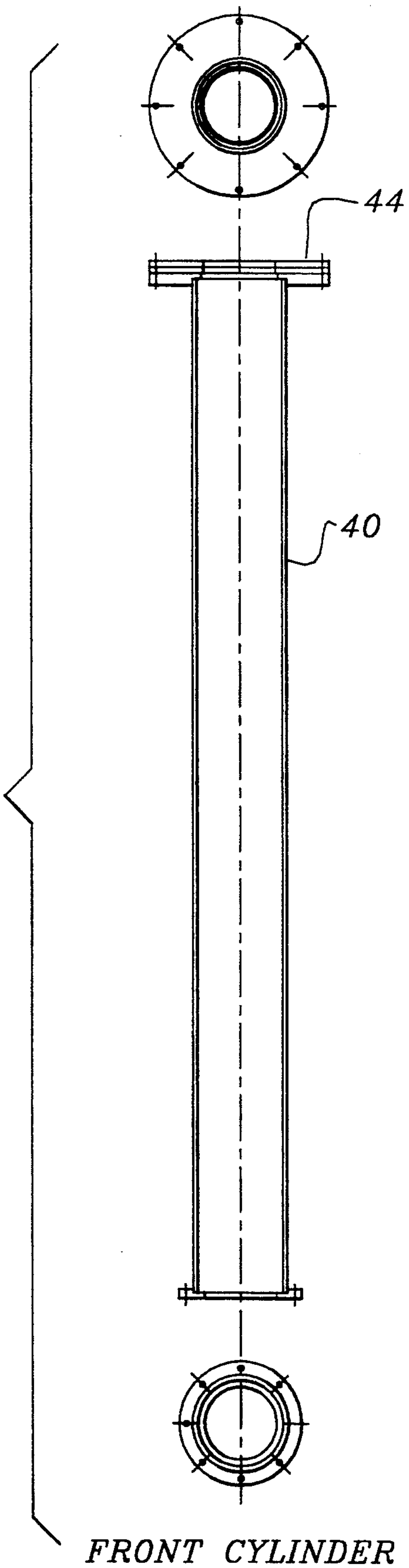
FIGS. 9A and 9B are cross sectional views of the front and back cylinders.
Figure 9A:
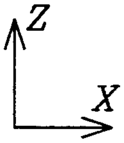
Figure 9B:
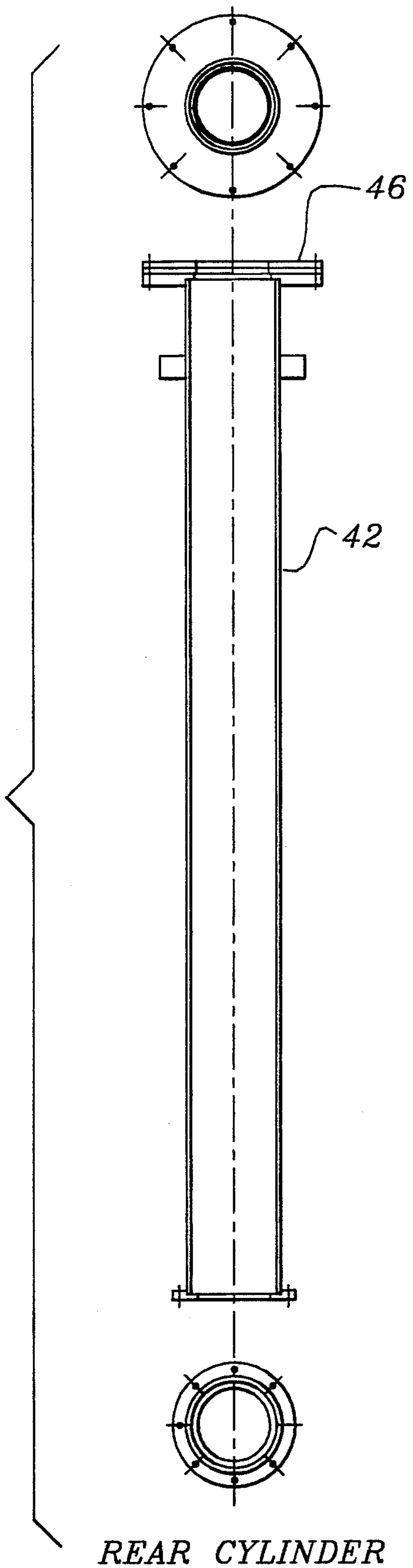

It is, thereby, to be appreciated that the upper ends of both the front jack cylinder 40 and rear jack cylinder 42 are provided with respective flange means 44 and 46 (see FIG. 9) which permit said front and rear cylinders 40 and 42 to be respectively suspended upon said trolley means 22 in the case of front cavity 10 and said spider structure 36 in the case of rear cavity 16.

With reference to the principles of operation of said screw lift assemblies 24 and 28 it is, with reference to FIGS. 1 thru 7, to be appreciated that said assemblies consist of certain common mechanical elements having defined interrelationships which are as follows:

A drive screw 48 is provided with a thrust bearing 50 and sprocket 52 (see FIGS. 7A and 7B) which, through a chain drive 54 which is powered by sprocket 56 of power drive 30. More particularly, power drive 30 includes a motor 58 which powers a gearbox 60 which in turn provides rotation to bevel gears 62 which then rotate said sprocket 56 through said chain drive 54 thereby accomplishing the rotation of sprocket 52 and thrust bearing 50, thereby achieving a controllable selectable rotation of drive screw 48. It is noted that various mechanical equivalents may be employed in lieu of said chain drive 54.

It is noted that, as a safety measure, there is provided a shear key 64, the function of which is to enable mechanical disassociation between screw drive 48 and power means 30 in the event of an accidental over-rotation of the screw drive.

Figure 7B:
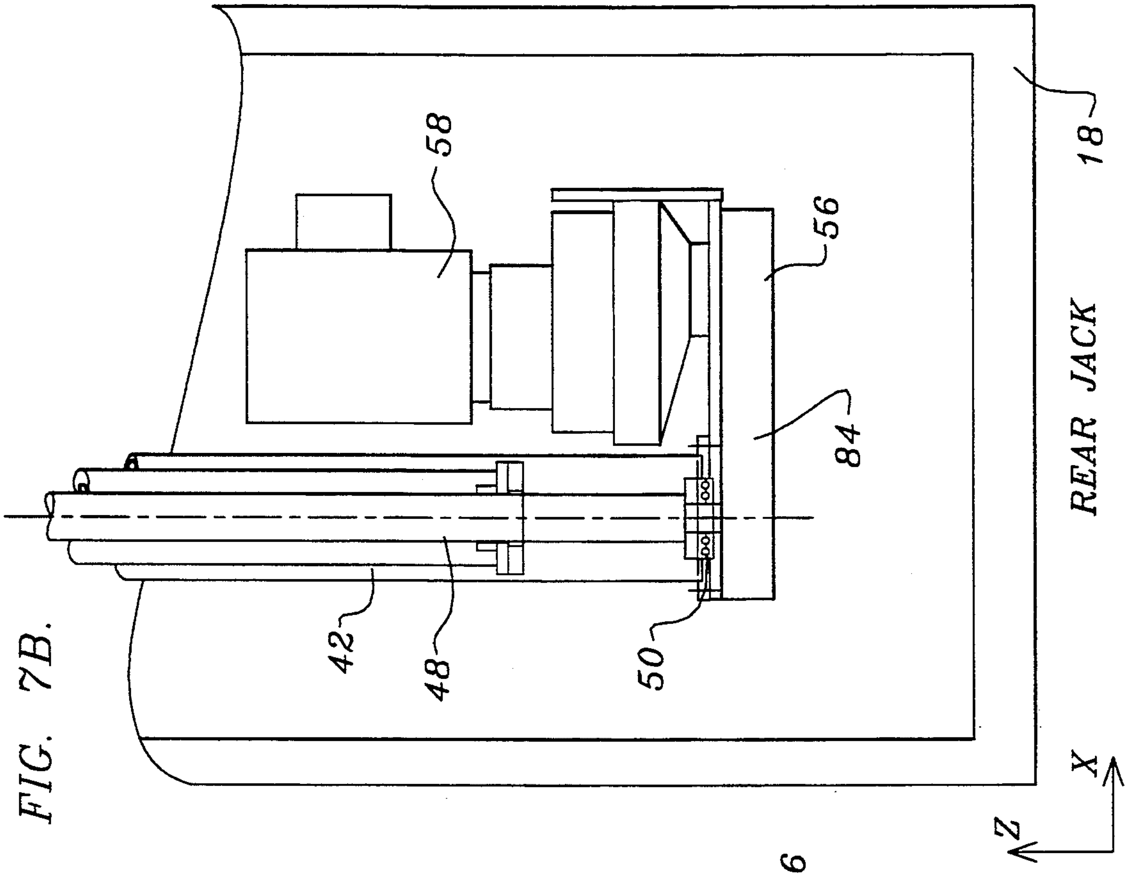
Figure 7A:
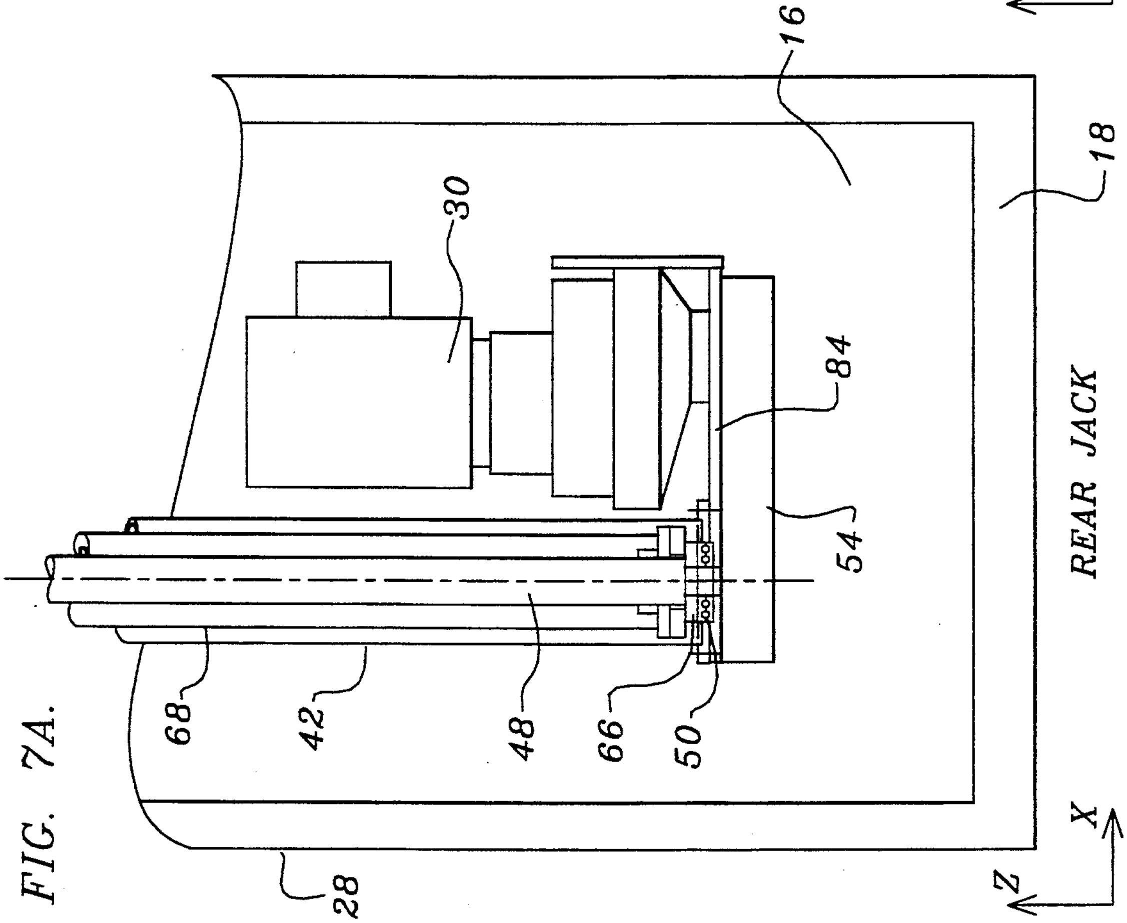
Figure 8:
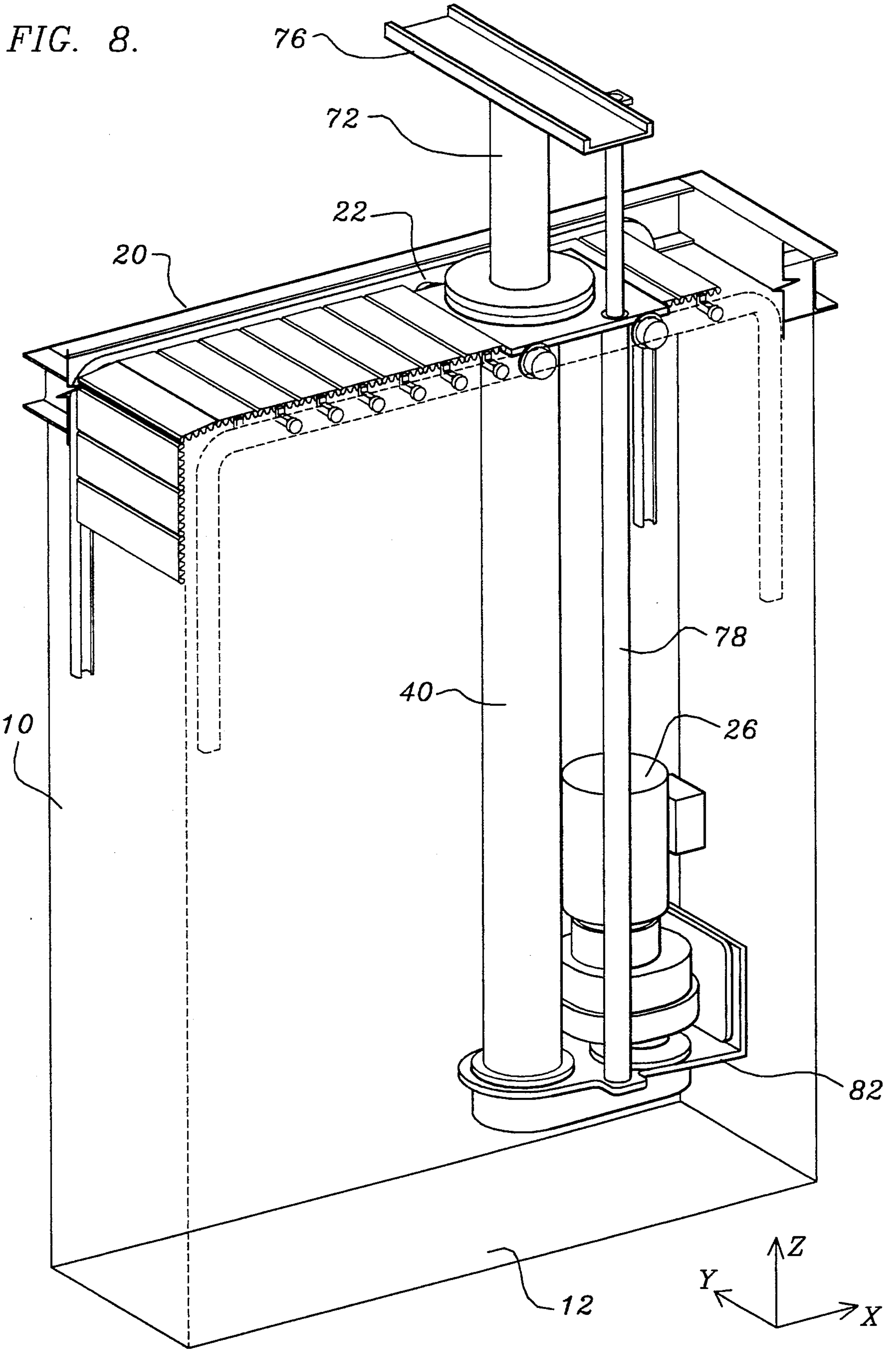
FIG. 8 is an isometric view of the track and trolley assembly of the front jack.

As may be noted in the view of FIG. 7B, which is sequential relative to the view of FIG. 7A, rotation of screw drive 48 will result in upward movement of load nut 66 which includes an annular flange. More particularly in the view of FIG. 4 may be seen piston 70, which rests upon load nut 66, and is elevated relative to depth 14 as the screw drive 48 rotates. Therein, load nut 66 and piston 70 are rotatably lifted within rear cylinder 42.

The same principles of operation above described with reference to the rear screw assembly 28 are applicable to front screw assembly 24. Therein front power means 26 is identical in mounting structure and general operation to said rear power means 30.

As may be noted in FIGS. 1 and 2, the top of piston 70 is provided with a transverse automotive vehicle wheel interface means 74 while said rear piston 72 is provided with a rear automotive wheel engagement means 76. With further reference to FIG. 2 there may be shown therein respective front and rear stabilizing bars 78 and 80 the function of which is to assure that wheel interface means 74 and 76 cannot rotate relative to surfaces 82 and 84 which connect the power means to the respective thrust bearings of the respective screw lift assemblies.

There is accordingly provided an overall automatize lift system having interchangeable front and rear screw lift means in which an automotive vehicle of essentially any size or weight can be elevated for purposes of service or otherwise, given suitable adaptation of the dimensions of the system.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

Having thus described my invention what I claim as new, useful and non-obvious and, accordingly, secure by Letters Patent of the United States is:

1. An automotive screw lift system, comprising:

(a) a front below ground level cavity having a first depth below a surface level thereof;

(b) track means secured across a mouth of said front cavity proximally to said surface level thereof;

(c) trolley means proportioned for slidable longitudinal movement within said track means of said front cavity;

(d) a rear below ground level cavity having a depth greater than said first depth of said front cavity, said rear cavity disposed along a given longitudinal axis relative to said front cavity;

(e) rear cavity enclosure means secured within a top opening of said rear cavity, said rear enclosure means positioned beneath said surface level; and (f) front and rear screw lift means each having a length less than said first depth of said cavity, said length means each having an upper end thereof having flange means selectably interfaceable with either said trolley means or said rear cavity enclosure means, whereby either of said screw lift means may be positioned within either of said respective trolley and rear enclosure means within either of said respective front and rear below ground level cavities.

2. The system as recited in claim 1, in which each of said front and rear screw lift means comprises:

(g) a vertically oriented screw drive having an upper end and a lower end, said lower end including an annular thrust bearing;

(h) power means for imparting selectable rotation to said screw drive, said means in mechanical linkage to said thrust bearing of said screw drive;

(i) a load nut screw-threadably and non-rotationally mounted upon said screw drive;

(j) a hollow cylinder positioned about said screw drive along substantially the entire length thereof, said cylinder non-rotationally linked to said load nut;

(k) a hollow piston, having an upper end and a lower end, positioned radially inwardly of said cylinder, having said lower end thereof rigidly mounted onto said load nut; and (l) vehicle wheel interface means secured upon the upper end of said piston, whereby said load nut and, therewith, said piston will elevate responsive to rotation by said power means.

3. The system as recited in claim 2, further comprising:

(m) in each lift means, means for preventing rotation of said wheel interface means relative to said power means.

* * * * *